United States Patent Office 3,463,854
Patented Aug. 26, 1969

3,463,854
METHOD OF TREATMENT FOR EFFECTING VASODILATION OF THE SMALL ARTERIES IN HUMAN BEINGS
Tibor L. Kopjas, 95 W. Moreland, Collinsville, Ill. 62234
No Drawing. Continuation-in-part of application Ser. No. 586,025, Oct. 12, 1966. This application May 8, 1968, Ser. No. 727,708
Int. Cl. A61k 27/00
U.S. Cl. 424—251     3 Claims

ABSTRACT OF THE DISCLOSURE

A method of treating human beings for effecting vasodilation of the capillary vascular system by administration of folic acid.

BACKGROUND AND SUMMARY OF THE INVENTION

This invention relates in general to methods of therapeutic treatment and, more particularly, to a method for effecting vasodilation of the capillary vascular system.

This application is a continuation-in-part of patent application Ser. No. 586,025, filed Oct. 12, 1966, now abandoned, for Method of Treating Arteriosclerotic Vascular Disease With Folic Acid, which application will now be permitted to become abandoned in view of its being superseded by this present application.

Extensive research primarily within the field of geriatric has demonstrated that numerous disorders are brought about through circulatory disturbances so that treatment of such conditions has indicated the necessity of providing good blood supply with enhanced collateral circulation, that is, within the capillary vascular system.

Exemplary of such conditions are arteriosclerosis and chronic leg ulcers. In the former condition there is a progressive intimal thickening and degeneration of the arterial vessel wall by focal deposit of lipids and fibrosis in the endothelial connective tissue of the intima with the circulation through such arteries being markedly reduced resulting in reduction of blood supply to the tisuses. The development and improvement of collateral circulation is admittedly vital with arteriosclerosis and especially so wherein the arterial system may be extensively damaged by atheromas and wherein surgical intervention would constitute an exceeding risk.

In cases of arteriosclerosis, various disturbances are experienced by patients, such as those having marked circulatory deficiency in the limbs when the arteriosclerosis is of the diffuse chronic type. Other complaints regard visual acuity as acute episodes of visual aura of blurriness may be experienced. Heretofore, various attempts have been made to improve the circulatory problems encountered in arteriosclerosis including surgery, drugs for expanding or widening the arteries, and vitamin therapy. However, none of these efforts have proved efficacious.

Chronic leg ulcer is a common disorder in elderly patients. Although there are numerous types of such ulcers, the same for the most part are caused by venous stasis. Other important types of ulcers are the ischemic of atherosclerosis, those due to thromboangiitis obliterans, arteriolar ulcers in long standing hypertension, those of chronic chilblain and livedo, as well as ulcers of systemic lupus erythematosus, scleroderma, periarteritis nodosa and hypersensitive angiitis. However, regardless of the etiological basis of leg ulcers, successful treatment depends upon an important local factor, that is, adequate blood supply to the affected area.

Numerous types of treatments have been heretofore attempted for curing chronic leg ulcers but such have not proved efficacious resulting in the undesired and unpleasant longevity of such ulcers to the extent that the same have been generally considered truly chronic.

It is, therefore, an object of the present invention to provide a method for treating circulatory disturbances in human beings for the purpose of improving the collateral circulation by administering folic acid.

It is another object of the present invention to provide a method for effecting vasodilation for the microcirculation in order to bring about substantial blood supply to affected areas for beneficial therapy as by the administration of folic acid.

It is a further object of the present invention to provide a method of treating arteriosclerosis by administering folic acid to patients either parenterally or orally and which method has proven effective for increasing the circulation, and improving visual acuity, among other beneficial results.

It is a further object of the present invention to provide a method for treating arteriosclerosis and chronic leg ulcers which may be effected most economically, and without necessity of hospitalization.

With the above noted objects in view, my invention resides in the novel compositions, methods and processes presently described in the following specification and pointed out in the claims.

In essence, the present invention contemplates the providing of folic acid as the medicament of choice for treating various circulatory conditions, such as, arteriosclerosis and chronic leg ulcers, being administered to a patient either orally or parenterally, either intravenously, intramuscularly, or subcutaneously. Such treatment continuing over a limited period of time and in indicated dosages.

In order to establish the effectiveness of folic acid for various vascular disorders, particularly in elderly people, extensive research was conducted which involved the administering of folic acid in predetermined dosages to various groups of human beings sufferings from arteriosclerosis and chronic leg ulcers.

In order to establish the efficacy of folic acid as a medication for collateral circulation or vasodilation for the microcirculation in patients with arteriosclerosis, several groups of patients were selected after very careful physical examination and the arterial deficiency recorded. The group division was dictated by the age of the patients, the length of the disease known by the patients, and the grade of arterial damage.

The first group of patients had an average age of 80 years and although having suffered from arteriosclerosis for a relatively extensive period of time, had no particular problems except with respect to visual acuity. Fundoscopic examination revealed arteriolarsclerosis, or a relative hardening of the smaller blood vessels in the eye. Each patient's reading ability was tested with and without corrective lenses in an evenly illuminated examining room on an eye chart from a distance of 6 meters. Each patient was then parenterally treated, intravenously, with 7.5 mg. of folic acid and after such administration the reading ability changes were recorded every 20 minutes. This testing was repeated twice with a week interval. To avoid any opportunity of memorizing, the letters on the reading chart were frequently changed.

In an average of 40 minutes after the injection, each of the patients in this first group showed marked improvement in visual acuity. With corrective lenses, they were able to read two lines below the previously recorded lines prior to medication. Without the corrective lenses, an average of 60 percent of the letters of the next line were identified. In certain of the patients the improved reading ability lasted more than 24 hours. Thus, this test demonstrated the relative immediate affects of the folic acid on the small arteries.

The second group of patients had an average suffered from chronic diffuse peripheral vascular disease for at least 10 years and had taken no type of medication prior to the study. Each patient was evaluated separately in a comfortable supine position with feet bare. Twenty five minutes was allowed for the patient's body and room temperature adjustment. The temperature changes; oral, hands, and between the toes, were checked with a banjo-type thermoresistor element connected to an ultrasensitive microampere meter. Capillary blood flow variation changes were observed through pulse signals on an oscilloscope. The pulse signals were detected by photocell-type plethysmograph and pulse-sensor devices placed on the capillary bed of a limb (fingertip or toe) affected with arteriosclerosis. The pulse signals exhibited notching (dicrotic) which is believed to be a reflected pulse wave produced by recoil of blood off the aortic valve as the latter closes in response to the tendency of the arterial back flow occurring during the elastic return of the aortic walls following the decline of the systolic ejection pressure.

Each patient in the second group received an injection of 7.5 mg. folic acid, intravenously, and the temperature and capillary blood flow changes were then observed for one hour. Most of the patients in this group responded positively to the administration of folic acid as all experienced pleasant, warm sensations in the face and head within an average of 5 minutes after injection. Within an average of 10 minutes after injection, such warm sensations were felt in the hands and at least one-half of the patients felt warmth in their feet 30 minutes after the injection. With most patients in this group, each for a period of 2 days after the injection, experienced warm feeling episodes having a duration of 5 to 10 minutes several times each day. Temperature changes occurred only in the first 25 minutes after injection, with the oral temperature increasing in average of .4° C.; the temperature of the hands increasing an average of .7° C.; and the temperature of the feet increasing an average of .2° C. to .4° C. Instruments disclosed an average of 3 percent notching increase on the big toe of the lesser affected limb. The pulse-sensory device showed marked increase of the pulse wave on the finger tip capillary bed 10 minutes after injection. Clearly, with the patients in the second group the single folic acid injection brought about increased circulation with accompanying pleasing sensations of warmth, as well as temperature elevation.

The patients in the third group were sufferers of diabetes mellitus having diabetic retinopathy and arteriosclerotic obliterans. These patients had an average age of 72 years and certain of them had a half dime-size pregangrenous ulcer on their toe. In addition to their daily insulin and maintenance dose of digitalis, each of the patients in this group were administered orally 5 mg. of folic acid, in tablet form, once daily for a period of 4 consecutive weeks. The patients in this group were evaluated weekly for the 4 week period to determine skin temperature changes and for examination as to visual acuity. With the majority of the patients in this group there were observed general improvement in the skin temperature, particularly of the affected limb and in their visual acuity. Those having the pregangrenous ulcer were completely healed.

A further group consisting of relatively young patients with longer existing vascular disease were administered 10 mg. of folic acid orally. Only one noticed warmness in her hands within 24 hours. From this it appears that the folic acid vasrodilator affects on the small arteries is more noticeable in young patients as doubtless due to the larger number of capillaries and, hence, better developed collateral circulation.

In none of the group experiments was there detected any blood pressure elevation or increase of pulse rate. No side affects of any type were noticed during the study or other the same was completed.

From the foregoing it is thus apparent that folic acid by itself constitutes a highly effective therapeutic agent in the treatment of arteriosclerosis apparently having substantial vasodilator properties particularly operable on the capillaries and collateral circulation and being effective in reducing the symptoms of patients suffering with chronic hardening of the arteries in the extremities, as well as for increasing visual acuity by increasing the blood flow to the eye and assisting the corpuscles to take up oxygen for delivery to oxygen-denied tissues.

As shown hereinabove, the folic acid may be administered orally or parenterally and may be most easily provided for a patient with minimum discomfort and inconvenience.

To establish the therapeutic value of folic acid for treatment of chronic leg ulcers ten patients were selected for study—three males and seven females. The average age was 61. Four of the patients, with moderate to advanced arteriosclerosis, had ischemic leg ulcers. One of these had had a leg amputated above the knee because of advanced arteriosclerosis and gangrene with ischemic ulcers of the leg; the stump healed very slowly even though vasodilators were used continuously. Vascular surgery involving vein grafts between the superficial femoral and popliteal arteries was performed on another patient with severe arteriosclerotic changes in both lower extremities; after two months the graft on the right side become occluded and a dime-sized ischemic ulcer developed on the inner aspect of the malleolar area. The remaining two of the four patients had ischemic ulcers 3 to 5 mm. in diameter on each toe; the legs were cold, with diminished pulsation and changes in skin color. The six other patients had chronic venous stasis ulcers varying from 1 to 7 cm. in diameter.

Each patient received a 5-mg. tablet of folic acid three times daily for three months. Four patients (two with ischemic ulcers and two with larger venous ulcers) received in addition 20 mg. of folic acid twice weekly by intravenous injection. The patients were seen in the office twice a week for evaluation of progress.

All but two were instructed to dress their ulcers daily with plain sterile gauze pads. The two exceptions were cases of infection and grade II edema. For these two patients antibiotic ointment and diuretics were prescribed until the infection and edema had improved. No other medication was used in the three month study period.

The results were as follows: In the patients with smaller venous stasis ulcers, one to three cm. in diameter, complete repair was achieved within six to eight weeks. In patients with larger ulcers, the ulcers were healed in twelve weeks.

The atherosclerotic ischemic ulcers also showed marked improvement. After two months of folic-acid therapy, satisfactory repair of the ulcer was observed in the amputee who had previously had difficulty with healing of the stump; in the other leg there was definite improvement in skin color and temperature. In the patient who had undergone vascular surgery, the ischemic malleolar ulcer on the side with the occluded graft was completely healed in six weeks; both legs became noticeably warmer and walking ability improved. A comparison of arteriograms obtained before and after folic-acid therapy showed marked dilation of the collateral arteries in the affected limb after treatment. In the two patients with ischemic toe ulcers, there was great improvement during therapy. No side effects were observed during therapy. Most of the patients are still taking the folic acid. No recurrence of ulcer has been reported to date.

Blood supply is the most important factor for proper wound healing. All the nutritive elements, oxygen supply, immune substances and defensive cells reach the area of injury through the vascular network. In older patients with generalized vascular disease, the poor blood supply does not provide enough hydrodynamic pressure to dilate the small arteries and develop collaterals. Therefore, the blood supply is dependent upon the microcirculation of the vasa vasorum and on the loose network of the anastomotic capillary beds surrounding the outer coat (adventitia) of the arteries. It has been observed that in elderly persons with atherosclerosis, there are more vasa vasorum than in normal persons.

Folic acid has thus proved to be an effective vasodilator of the micro blood vessels so as to assure of sufficient blood supply for healing of the ulcers. It may be added that folic acid appears to play an additional role in such healing process in that it contributes to the systemic factor in protein metabolism probably through the coenzymatic action which is essential for wound repair.

Accordingly, in view of the foregoing, the administration of folic acid to human beings for treating various circulatory disturbances by effecting vasodilation of the capillary vascular system is well established through careful, scientific and extensive research with afflicted human beings.

It should be understood that changes in the methods, compositions, percentages and combinations set forth may be made without departing from the nature and principle of my invention.

Having thus described my invention, what I claim and desire to obtain by Letters Patent is:

1. A method of treating a human being for effecting vasodilation of the capillary vascular system consisting of the administration of an effective amount of folic acid to a human being requiring such treatment.

2. A method of treating a human being for effecting vasodilation of the capillary vascular system consisting of administering in tablet form an effective amount of folic acid to a human being requiring such treatment.

3. The method of treating as defined in claim 1 and further characterized by administering the folic acid parenterally to said human being.

References Cited

Chemical Abstracts, vol. 59, p. 936G (1963).

ALBERT T. MEYERS, Primary Examiner

S. J. FRIEDMAN, Assistant Examiner